(12) United States Patent
Kramer et al.

(10) Patent No.: US 7,771,315 B2
(45) Date of Patent: Aug. 10, 2010

(54) METHOD FOR CONTROLLING AN AUTOMATIC TRANSMISSION

(75) Inventors: Rupert Kramer, Friedrichshafen (DE); Mario Steinborn, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 565 days.

(21) Appl. No.: 11/628,565

(22) PCT Filed: Jun. 3, 2005

(86) PCT No.: PCT/EP2005/005980
§ 371 (c)(1),
(2), (4) Date: Jan. 29, 2007

(87) PCT Pub. No.: WO2005/121606
PCT Pub. Date: Dec. 22, 2005

(65) Prior Publication Data
US 2008/0261772 A1    Oct. 23, 2008

(30) Foreign Application Priority Data
Jun. 5, 2004   (DE) ................. 10 2004 027 597

(51) Int. Cl.
*F16H 59/30* (2006.01)
*F16H 61/00* (2006.01)
*B60W 10/04* (2006.01)
(52) U.S. Cl. ................... 477/124; 477/109; 477/116
(58) Field of Classification Search .............. 477/94, 477/115, 116, 124, 183, 109, 113, 83, 84, 477/187
See application file for complete search history.

(56) References Cited

U.S. PATENT DOCUMENTS

| 5,409,432 | A | * | 4/1995 | Steeby | 477/71 |
| 5,413,012 | A | * | 5/1995 | Davis | 74/335 |
| 5,441,464 | A | * | 8/1995 | Markyvech | 477/109 |
| 5,533,946 | A | * | 7/1996 | Markyvech | 477/78 |
| 5,842,376 | A | * | 12/1998 | Dresden et al. | 74/336 R |
| 6,017,291 | A | * | 1/2000 | Ailes et al. | 477/124 |

(Continued)

FOREIGN PATENT DOCUMENTS

DE    199 28 510 A1    1/2001

(Continued)

OTHER PUBLICATIONS

EPO, English translation of DE10102016A1, http://epo.worldlingo.com/wl/epo/epo.html, Jul. 21, 2009.*

*Primary Examiner*—Roger Pang
(74) *Attorney, Agent, or Firm*—Davis & Bujold, P.L.L.C.

(57) ABSTRACT

A method for the control of an automatic transmission during a change of ratio procedure, wherein the synchronous speed of rotation (SD) for the new transmission gear-stage lies under the no-load speed of rotation (LD) of a drive motor which can be connected to the transmission and wherein a gear-stage engagement actuator for the engagement of a new transmission gear-stage is then activated, when the transmission input speed of rotation (GED) has reached a predetermined speed of rotation window (F), which window also encompasses the synchronous speed of rotation (SD). In order to make such a shifting method more comfortable than previously, the invented method deviates from that procedure based on downshifting, which has been customary up to this time and rather proceeds in a upshifting mode.

18 Claims, 1 Drawing Sheet

U.S. PATENT DOCUMENTS

| | | | |
|---|---|---|---|
| 6,104,974 A | 8/2000 | Zhang et al. | |
| 6,231,474 B1 * | 5/2001 | Hawarden et al. | 477/94 |
| 6,461,274 B1 * | 10/2002 | Genise et al. | 477/109 |
| 6,773,373 B2 * | 8/2004 | Henneken et al. | 477/115 |
| 2003/0027683 A1 | 2/2003 | Grillenberger et al. | |
| 2006/0179963 A1 * | 8/2006 | Bachmann et al. | 74/339 |

FOREIGN PATENT DOCUMENTS

| | | |
|---|---|---|
| DE | 101 02 016 A1 | 7/2002 |
| DE | 102 28 708 A1 | 1/2003 |
| WO | WO-02/087916 A1 | 11/2002 |
| WO | WO-03/078197 A1 | 9/2003 |

* cited by examiner

METHOD FOR CONTROLLING AN AUTOMATIC TRANSMISSION

This application is a national stage completion of PCT/EP2005/005980 filed Jun. 3, 2005 which claims priority from German Application Serial No. 10 2004 027 597.1 filed Jun. 5, 2004.

FIELD OF THE INVENTION

The invention concerns a method for controlling an automatic transmission.

BACKGROUND OF THE INVENTION

Transmissions with automatized shifting facilities have been used for an appreciable time in various types of motor vehicles. It has become known, in the case of such motor vehicles, that preference is given to the functioning of a startup clutch and/or a shifting clutch in a manner similar to the selection of the shifting paths as well as the in and out positioning of the transmission gear stages with the aid of hydraulic pressure powered activators. These activators are usually constructed as piston-cylinder assemblies. Contrary thereto, motor vehicles are also known, wherein a start clutch and/or a shifting clutch or only those elements of the transmission, which serve for the selection between the in and out clutch positioning, would be shifted by auxiliary means.

In the case of the necessary transmission elements to carry out the in and out clutch positioning in a transmission, the concern is with known clutch arrangements, such as sliding sleeves, which move axially beside gear-position sensitive idler gears on a transmission shaft. For the engagement of a gear position, such a clutch arrangement, is impelled by its actuator in the direction of the appointed idler gear and caused to rotate until its rotational speed coincides with that of this gear, so that as a final result, a rotational-secured and output drive effective connection is consummated between the idler gear and the transmission shaft. The release of a gear position is accomplished by a counter-directed activation of the clutch auxiliary aid.

The activation of the actuator is controlled by way of a transmission control apparatus which is guided by a control and regulation program. In order to properly operate the clutch and shifting commands, this program processes data regarding, for example, the driving situation, the state of shifting, as well as the power input desired by the driver of the motor vehicle.

Automatized shifting transmissions used in personal passenger cars are normally regulated by the braking action of synchronization apparatuses, which possess friction surfaces on the involved idler gears and also on separate synchronizations, which act between an idler gear and an axially slidable clutch apparatus. These frictional surfaces contactingly confront one another and are mutually counter-acting. During a shifting procedure, with the aid of frictional contact of these surfaces, an adjustment of speeds of rotation between a transmission input shaft and an assigned idler gear may be achieved, wherein the idler gear is specific to a new gear-stage in the transmission.

Counter to the above, where commercial vehicles are concerned, as a rule, automatic transmissions are put to use, which operate well without the above described synchronization apparatus and function by way of comparatively simply constructed dog clutches. In order to cause an idler gear of the transmission, which gear is designed for a specific speed ratio, to synchronizingly match the speed of rotation of an assigned transmission shaft, automatic transmissions, in this situation, are governed by a transmission brake, by way of which the transmission input shaft during an upshift procedure, can be braked down to the desired speed of rotation.

To effect a ratio change procedure in such a transmission, it is generally unnecessary for the specified speeds of rotation or the synchronization, which comply with the desired new gear ratio and the travel speed of the vehicle, is exactly attained. Much more, it is customary to adjust the transmission input speed to the required synchronizing speed SD of rotation so that its value falls within the confines of an engagement speed of rotation window F. The threshold borders of this speed of rotation window F consist of respective speeds of rotation which lie somewhat above and somewhat below the synchronization speed value. The upper speed of rotation is termed FO and the lower speed of rotation is termed FU.

Upon the operation of automatized transmissions, certain situations bring about their own effects. For example, in this respect, in the case of startup gearshifting taking place shortly prior to a vehicle coming to standstill, the situation can be that the synchronous speed of rotation SD—which can also be the above mentioned speed of rotation window F—appropriate for the new gear stage, lies at a value less than the no-load speed of rotation LD of the vehicle motor. Such a situation is shown in FIG. 2 of the attached illustrations.

Shiftings of the type shown in FIG. 2 are, generally carried out as downshifts wherein, when the clutch is partially or completely engaged, the speed of rotation of the transmission input shaft continues to be adjusted to the value of the speed of rotation window F, which said speed is less than the no-load speed LD of the drive motor.

Marked by a signal of a control apparatus in the transmission, which calls for the activation of a gear-stage engagement actuator, in the case of known transmission control procedures, the actual gear engagement procedure is released at that point of time $t\_1$, wherein the transmission input speed of rotation GED has increased itself at the point of time $t\_1$ from a minimum value to the lower threshold FU of the speed of rotation window F.

Since the gradient of the transmission input shaft speed of rotation GED, in a case of a partially or completely engaged clutch, is scarcely to be influenced and is comparatively steep, the gear engagement procedure itself, that is, the turn-fast connection of the gear-stage specific idler gear to its assigned transmission shaft, can be considered as complete, with the aid of the clutch means, only when the transmission input speed of rotation GED, in the sense of a rotation over-shoot (see Figures), has just exceeded the upper speed of rotation level FO of the speed of rotation window F. In such a situation, there would be present a large differential in speeds of rotation with a corresponding loss of comfort in the case of the turn-fast connection of the idler gear which is bound to its assigned transmission shaft. Disengaging the clutch in order to ease the actual engagement of the gear-stage and to improve the comfort of the shifting is carried out generally too late or not at all.

With the above as a background, the invention has the purpose of presenting a control method for an automatic transmission, by way of which, a comfortable shifting procedure can be carried out, particularly in a case where the synchronous speed of rotation relative to that of the transmission incoming speed of rotation for the gear chosen, is less than the speed of rotation for a no-load condition of the drive motor, i.e., an empty run.

SUMMARY OF THE INVENTION

The invention is based on the knowledge, in the case of a procedure, wherein a synchronous speed of rotation for a new gear-stage lies under a no-load speed of rotation of the transmission motor, that shifting comfort clearly can be improved, if the transmission input speed of rotation, in a manner unlike methods used up to this time, which commonly approach synchronization as the speeds of rotation increase, but now, by the invention, can approach synchronization of the new gear-stage from rotation values of greater speed. The technical background for this is that, in such a high level of speed of rotation, with an disengaged clutch and dropping speed of rotation, the gradient of the speed of rotation curve is more easily influenced and on this account is more favorable for an engagement procedure than is the case where the speed of rotation is increasing with a partial or completely engaged clutch.

On this account, the invention proceeds from a method for controlling an automatic transmission during a period of ratio-alteration, wherein the synchronous speed of rotation for a new transmission gear-stage lies under the no-load speed of rotation of a transmission which is connected to the subject drive motor and wherein a gear-stage engagement actuator can be employed for the engagement of the new transmission gear-stage, when the transmission input speed of rotation has attained a predetermined speed of rotation window; the scope of which window also encompasses the synchronous speed of rotation. For the achievement of the stated purpose, provision has been made in this case that the invented shifting mode, deviating from the formerly used downshifting mode, is carried out in the upshifting mode.

By this way of controlling the shifting procedure, the transmission input speed of rotation is more comfortable and under certain circumstances the procedure is also faster than the previous method of compensating for the speed of rotation of the new transmission gear-stage to match the synchronous speed of rotation. The reason for this is that the speed of rotation of the motor, i.e., the speed of rotation of the transmission input shaft, in a case of partially engaged clutch, can be first increased by a comparatively higher speed of rotation gradient, and then, subsequently regulated by braking to achieve the synchronous speed of rotation.

Giving consideration to the release of corresponding control demands by a transmission control apparatus, this action leads to a situation, for example, wherein an input shift actuator in this operational situation is only activated, if the transmission input shaft reaches the upper speed of rotation value of the speed of rotation window as its rotational speed declines from a higher transmission input speed of rotation.

In an advantageous embodiment of the present invention, this means that the transmission input speed of rotation, with a partially or with a completely engaged startup or shifting clutch, is increased beyond the upper speed of rotation value of the speed of rotation window, and then the clutch is disengaged and finally the transmission speed of rotation is reduced down to the synchronous speed of rotation by braking.

According to another embodiment of the method, provision can be made to the effect that the startup or shifting clutch is disengaged after the transmission input speed of rotation has attained a value above the upper limit of the speed of rotation threshold value of the speed of rotation window and before this transmission input speed of rotation has reached the same value as that of the motor no-load speed of rotation.

In order to cause the ratio-change procedure to be as brief as possible, provision has been advantageously made to the effect that directly after the disengagement of the startup or shifting clutch, a transmission brake is activated which, directly or indirectly, acts in a brake-like manner on the transmission input shaft. In that arrangement, the transmission brake remains active, just at least, until the time the transmission input speed of rotation, as it declines from a higher value, meets the speed of rotation value of the higher value of the speed of rotation window.

According to another embodiment, it is possible that provision can be made that the transmission brakes are to remain in a braking status, due to regulation by the transmission control apparatus, until the transmission input speed of rotation has met the synchronous speed of rotation.

In addition, by way of the invention an embodiment of the method is acquired, wherein the transmission input speed of rotation remains active and under control until that point in time when the transmission input speed of rotation reaches the synchronous speed of rotation as the speed declines from a preselected or actually measured speed of rotation gradient value.

The disengagement of the startup or shifting clutch as well as the activation of the transmission brake can, however, be carried out in an overlapping manner, so that the transmission brake can be immediately activated, when the startup or shifting clutch is only partially disengaged.

Beyond this, it is judged as advantageous if the transmission brake is so brake-like activated that a transmission input speed of rotation gradient is produced with which a shifting method with the greatest possible comfort can be realized.

Finally, it is further a principle of the invention that a signal for the shifting of the gear-stages be released, when the transmission input speed of rotation declines downward to meet the upper speed of rotation value of the speed of rotation window or coincides with the synchronous speed of rotation.

The method, according to the invention, can also be employed if the startup and/or the shifting clutch is designed not to be dependent upon a separate actuator, but rather be made as an activated clutch by centrifugal force. In such a case, the speed of rotation of the drive motor is changed to bring about corresponding disengagement and engagement of the clutch.

BRIEF DESCRIPTION OF THE DRAWINGS

The invention will now be described, by way of example, with reference to the accompanying drawings in which.

DETAILED DESCRIPTION OF THE INVENTION

Figure 2:
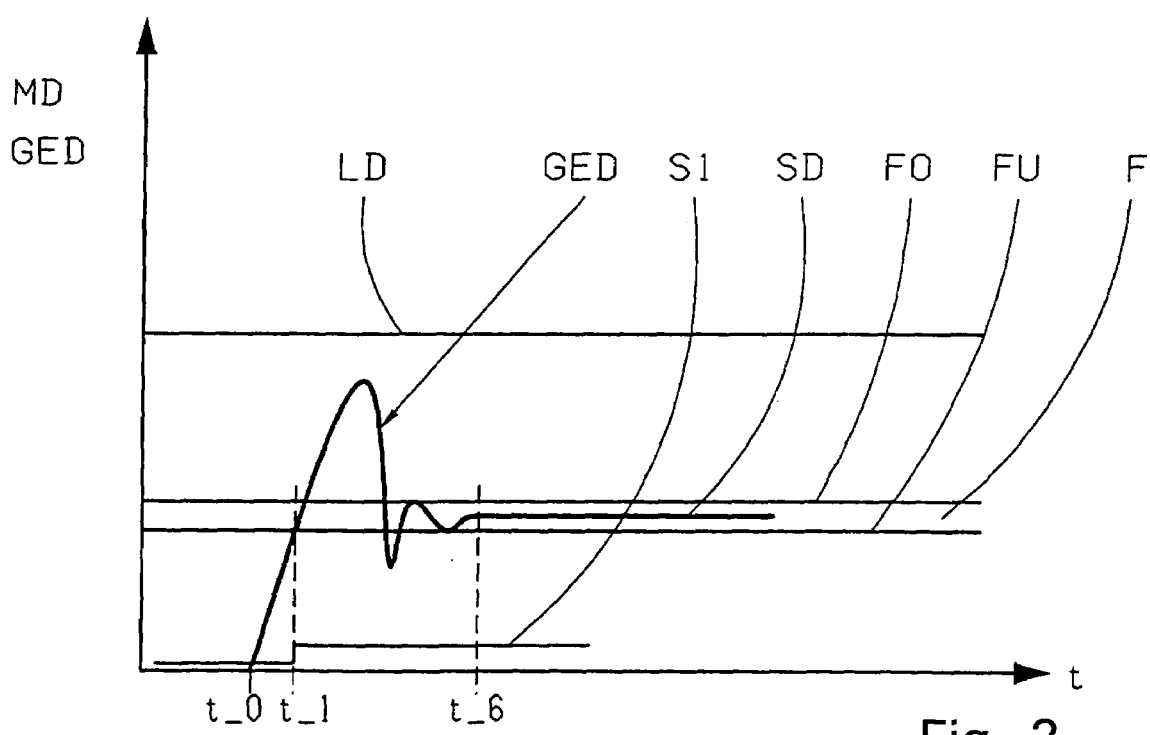
FIG. 2 is a presentation, as in FIG. 1, with the use of a known control method.

As has already been mentioned in the introductory passages, FIG. 2 shows the curve of a transmission input shaft of an automatic transmission, wherein the desired or the synchronous speed of rotation SD is clearly under the no-load speed of rotation LD of a drive motor. The motor is being connected with the transmission through a startup or shifting clutch.

The control method customarily employed in such a driving operational situation provides that, for the carrying out of the change of ratio procedure, the clutch is entirely or partially engaged and that from a starting point in time, namely t_0, by way of complete or partial engagement of the clutch, the speed of rotation GED of the transmission input shaft increases, as may be seen. At the same time in this matter, the drive motor of the vehicle runs at a no-load speed of rotation.

As soon as the transmission input speed of rotation GED, at the point of time t_1, has reached the lower border of the speed of rotation value FU, a signal S_1 is released for a gear-stage engagement actuator and, in keeping with this signal, the actuator starts with shifting into the selected gear-stage. At this juncture, as already described, this slides a clutch means, the means being a somewhat rotationally fixed and axially slidable sleeve on a transmission shaft, with which a gear-stage specific transmission idler gear becomes rotationally fixed to its assigned transmission shaft.

Since this mechanical method of shifting takes claim on a certain amount of time, this is done at the speed of rotation of the input shaft of the transmission, i.e., GED, the value of which lies clearly above the speed of rotation window F. On this account, there also exists a large difference between the synchronization speed of rotation SD and the speed of rotation of the input shaft of the transmission GED, which leads to an uncomfortable and a load impacted (bump) change of gear-stage. As may be seen in FIG. 2, the transmission input speed of rotation GED is only identical to the synchronous speed of rotation SD at point of time t_6, which denotes the end of the gear-stage shifting procedure.

Figure 1:
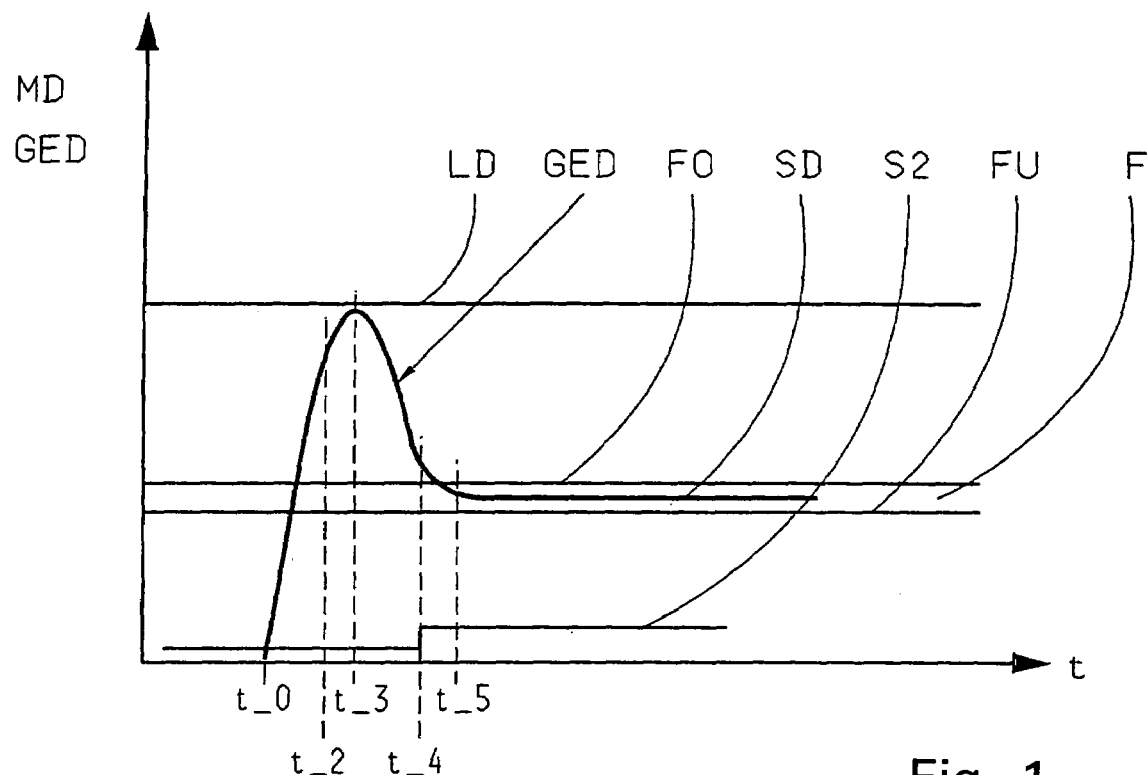
FIG. 1 is a plot of time against the run of the transmission input speed of rotation, wherein the synchronous speed of rotation lies under the no-load speed of the driving motor as it appears during the use of the invented control method.

FIG. 1, in comparison to the above, shows that increasing the transmission input speed of the rotation GED to the goal of synchronous speed of rotation SD is accomplished somewhat more rapidly with the aid of the invented control method and is carried out with a smoother course of the speed of rotation. On this account, a much more comfortable shifting procedure is achieved.

Even though in the case of the present shifting method, downshifting is employed, where the synchronous speed of rotation is less than that of the no-load speed of rotation of the drive motor of the vehicle, this ratio change procedure, according to the invention, is so carried out such that the advantages of working in the upshift mode are not lost.

In detail, in the case of a control method instigated by the signal of the transmission control apparatus, the startup or shifting clutch is partially or completely engaged so that a transfer of torque is made possible from the input drive shaft of the drive motor to the transmission input shaft of the automatic transmission. As made clear by FIG. 1, the drive motor runs, in this phase, at its no-load speed of rotation LD. Thus, starting at the point in time t_0, from which a sufficiently high torque becomes available for the acceleration of the transmission input shaft, the transmission input speed of rotation GED is increased with a comparatively large speed of rotation gradient.

It is of particular interest that the control signal S_2 (FIG. 1) for the activation of the gear-stage engagement actuator is not released in the invented method in the manner of FIG. 1 immediately at the point of equality of the speeds of rotation between the transmission input shaft and the lower threshold value FU of the speed of rotation window F, but actually later, at the point in time t_4.

Thereby, the transmission input speed of rotation GED continues to increase. In this example, at point of time t_2, the clutch is disengaged by an appropriate control-demand, so that the transmission input speed of rotation next continues to turn with a reducing speed of rotation gradient without driving power. Overlapping as time progresses, with the opening of the clutch, or, as shown in FIG. 1, immediately following the disengagement of the clutch, at the point of time t_3 a transmission brake is activated by way of which the braking effect on the transmission input shaft, the speed of rotation of this input shaft GED is immediately reduced at point of time t_4.

At this point of time t_4, the transmission input speed of rotation GED, coming down from a higher value, reaches the upper speed of rotation value FO of the speed of rotation window F. This event is sensed by the transmission control apparatus and considered as a starting time for the release of the control signal S_2 on the gear-stage engagement actuator. By way of the actuation effect of the gear-stage engagement actuator on the clutch in the automatic transmission, the specific change of the ratio change is allowed to be completed and subsequently the clutch is again engaged. The change of gear-stage is then completed at the point of time t_5, which still lies prior to the point in time t_6, according to FIG. 2.

FIG. 1, as compared to FIG. 2, makes clear that the transmission input speed of rotation GED, during the use of the method according to the invention, achieves a very harmonic curve of the desired or the synchronous speed of rotation SD so that, in a variance to the known method, a more comfortable shifting procedure can take place.

Insofar as the startup and/or the shifting clutch is not designed to be actuated by a separate actuator, but is activated on the basis of centrifugal force, then, according to the invention, provision is made that for the disengagement and engagement of the clutch, the speed of rotation of the drive motor is changed.

REFERENCE NUMERALS

F speed of rotation window with upper and lower thresholds
FU lower threshold speed of rotation value of window
FO upper threshold speed of rotation value of window
GED transmission input speed of rotation
LD no-load speed of rotation of the driving motor
MD motor speed of rotation
SD synchronization speed of rotation
t time
t_0 start point of time
t_1 start point of time for the activation of the gear input-stage actuator (State of Technology)
t_2 point of time of the opening of the clutch
t_3 point of time for the activation of a transmission brake
t_4 starting point of time for the activation of the gear input actuator
t_5 point of time of the speed of rotation equality (compensation)
t_6 point of time of the speed of rotation equality (compensation) (FIG. 2)
S_1 shifting signal (Prior Art)
S_2 shifting signal

The invention claimed is:

1. A method of controlling an automatic transmission during a downshift procedure by utilizing braking to achieve transmission synchronization when a synchronous speed of rotation (SD) for a new transmission gear-stage is lower than a no-load speed of rotation (LD) of a drive motor connected to the automatic transmission, the method comprising the steps of:

maintaining a transmission speed of rotation (GED) constantly below a no-load speed of rotation (LD) of a drive motor connected to the automatic transmission;
activating a transmission brake;

releasing a signal for a gear-stage shift while the transmission input speed of rotation (GED) is declining but prior to the transmission input speed of rotation (GED) reaching an upper speed of rotation value (FO) of a predetermined speed of rotation window (F), with the rotation window (F) encompassing the synchronous speed of rotation (SD); and activating a gear-stage engagement actuator for engagement of the new transmission gear-stage, if the transmission input speed of rotation (GED) reaches a predetermined engagement speed of rotation window (F).

2. The method according to claim 1, further comprising the steps of disengaging a clutch when the transmission input speed of rotation (GED), during one of a partially or a completely engaged one of a startup or a shifting clutch, by increasing the speed of rotation of the drive motor up to more than an upper speed of rotation threshold value (FO) of a speed of rotation window (F); and slowing the transmission input speed of rotation (GED) to the synchronous speed of rotation (SD).

3. The method according to claim 2, further comprising the step of opening one of the startup or the shifting clutch, after the transmission input speed of rotation (GED) has exceeded the upper speed of rotation threshold value (FO) of the speed of rotation window (F) and before the transmission speed of rotation has reached the no-load motor speed of rotation (LD).

4. The method according to claim 1, further comprising the step of activating the gear-stage engagement actuator, when the transmission input speed of rotation (GED) has reached an upper speed of rotation threshold (FO) value of the speed of rotation window (F) from a point of higher transmission input speed of rotation.

5. The method according to claim 1, further comprising the step of disengaging at least one of a startup and a shifting clutch before activating the transmission brake.

6. The method according to claim 1, further comprising the step of continually braking the transmission via the transmission brake at least until the transmission input speed of rotation (GED) declines from a high value to reach an upper speed of rotation value (FO) of the engagement speed of rotation window (F).

7. The method according to claim 1, further comprising the step of continually controlling activation of the transmission brake at least until the transmission input speed of rotation (GED) has reached the synchronous speed of rotation (SD).

8. The method according to claim 1, further comprising the step of the continually controlling activation of the transmission brake at least until the transmission input speed of rotation reaches the synchronous speed of rotation from an actual speed of rotation gradient value.

9. The method according to claim 1, further comprising the step of releasing a closure signal for at least one of a startup clutch and a shifting clutch for the assumption of a slip position, when the transmission input speed of rotation (GED) has reached one of an upper speed of rotation threshold value (FO) of the speed of rotation window (F), or has reached the synchronous speed of rotation (SD) as it declines from a higher speed of rotation value.

10. The method according to claim 1, further comprising the step of designing at least one of a startup clutch and a shifting clutch to be activated by centrifugal force and changing the speed of rotation of the drive motor for the disengagement and the engagement of the clutch.

11. The method according to claim 1, further comprising the step of the continually controlling activation of the transmission brake at least until the transmission input speed of rotation reaches the synchronous speed of rotation from an actual speed of rotation gradient value.

12. A method of controlling an automatic transmission during a downshift procedure when a synchronous speed of rotation (SD) for a new transmission gear-stage is lower than a no-load speed of rotation (LD) of a drive motor connected to the automatic transmission, the method comprising the steps of:

initiating the control method:

activating a gear-stage engagement actuator for engagement of the new transmission gear-stage, if a transmission input speed of rotation (GED) has reached a predetermined engagement speed of rotation window (F), with the rotation window (F) encompassing the synchronous speed of rotation (SD); and immediately activating a transmission brake when one of a startup clutch and a shifting clutch is only partially disengaged.

13. A method of controlling an automatic transmission during a downshift procedure when a synchronous speed of rotation (SD) for a new transmission gear-stage is lower than a no-load speed of rotation (LD) of a drive motor connected to the automatic transmission, the method comprising the steps of:

initiating the control method;

disengaging one of a startup clutch and a shifting clutch;

immediately activating a transmission brake when one of the startup clutch and the shifting clutch is only partially disengaged; and activating a gear-stage engagement actuator for engagement of the new transmission gear-stage, if a transmission input speed of rotation (GED) reaches a predetermined engagement speed of rotation window (F), with the rotation window (F) encompassing the synchronous speed of rotation (SD).

14. The method according to claim 13, further comprising the steps of disengaging a clutch when the transmission input speed of rotation (GED), during one of a partially or a completely engaged one of a startup or a shifting clutch, by increasing the speed of rotation of the drive motor up to more than an upper speed of rotation threshold value (FO) of a speed of rotation window (F); and slowing the transmission input speed of rotation (GED) to the synchronous speed of rotation (SD).

15. The method according to claim 14, further comprising the step of opening one of the startup clutch and the shifting clutch, after the transmission input speed of rotation (GED) exceeds the upper speed of rotation threshold value (FO) of the speed of rotation window (F) and before the transmission speed of rotation reaches the no-load motor speed of rotation (LD).

16. The method according to claim 13, further comprising the step of activating the gear-stage engagement actuator, when the transmission input speed of rotation (GED) reaches an upper speed of rotation threshold (FO) value of the speed of rotation window (F) from a point of higher transmission input speed of rotation.

17. The method according to claim 13, further comprising the step of continually braking the transmission at least until the transmission input speed of rotation (GED) declines from a high value to reach an upper speed of rotation value (FO) of the engagement speed of rotation window (F).

18. The method according to claim 13, further comprising the step of continually controlling activation of the transmission brake at least until the transmission input speed of rotation (GED) reaches the synchronous speed of rotation (SD).

* * * * *